United States Patent
Powers et al.

(10) Patent No.: US 11,807,255 B2
(45) Date of Patent: Nov. 7, 2023

(54) PROGRAMMABLE INPUT DEVICE FOR A VEHICLE

(71) Applicant: Ford Global Technologies, LLC, Dearborn, MI (US)

(72) Inventors: Jacob Gregory Powers, Livonia, MI (US); Thomas Karl Rothermel, Waterford, MI (US); David Michael Horan, Northville, MI (US); Patrick Gordon Collins, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 177 days.

(21) Appl. No.: 17/523,248

(22) Filed: Nov. 10, 2021

(65) Prior Publication Data

US 2023/0143533 A1 May 11, 2023

(51) Int. Cl.
*B60W 50/04* (2006.01)
*B60W 50/10* (2012.01)
*B60W 50/00* (2006.01)

(52) U.S. Cl.
CPC .......... *B60W 50/045* (2013.01); *B60W 50/10* (2013.01); *B60W 2050/0019* (2013.01)

(58) Field of Classification Search
CPC ............... B60W 50/045; B60W 50/10; B60W 2050/0019
See application file for complete search history.

(56) References Cited

U.S. PATENT DOCUMENTS

| | | | |
|---|---|---|---|
| 6,078,252 A | 6/2000 | Kulczycki et al. | |
| 7,243,007 B2 | 7/2007 | Wilson et al. | |
| 8,818,624 B2* | 8/2014 | Small | G06F 3/04886 701/487 |
| 9,372,607 B1* | 6/2016 | Penilla | G06F 3/04883 |
| 10,065,502 B2* | 9/2018 | Miller | B60K 35/00 |
| 2005/0021190 A1* | 1/2005 | Worrell | B60K 37/06 701/1 |
| 2012/0229411 A1* | 9/2012 | Arai | G06F 3/04817 345/173 |
| 2014/0303839 A1* | 10/2014 | Filev | G06F 3/0481 701/36 |
| 2015/0145790 A1* | 5/2015 | Kim | B60K 35/00 345/173 |
| 2016/0303968 A1* | 10/2016 | Miller | B60K 35/00 |
| 2017/0052666 A1* | 2/2017 | Wang | G06F 3/0484 |
| 2019/0152386 A1* | 5/2019 | McQuillen | B60K 35/00 |
| 2019/0163288 A1* | 5/2019 | You | G06F 3/1423 |

(Continued)

FOREIGN PATENT DOCUMENTS

CA 2666966 7/2013

*Primary Examiner* — Sze-Hon Kong
(74) *Attorney, Agent, or Firm* — Vichit Chea; Price Heneveld LLP

(57) ABSTRACT

A system for a vehicle includes a first input device and a second input device that provides a plurality of selectable input options. The plurality of selectable input options comprises a plurality of control input options for controlling a plurality of vehicle functions and an association input option for associating the first input device with at least one vehicle function suggested from among the plurality of vehicle functions. The at least one vehicle function is suggested based on historical use of the control input option that controls the at least one vehicle function and an accessibility score of the control input option.

20 Claims, 9 Drawing Sheets

(56) References Cited

U.S. PATENT DOCUMENTS

| | | |
|---|---|---|
| 2019/0196851 A1 | 6/2019 | Penilla et al. |
| 2019/0265884 A1* | 8/2019 | Penilla .................... B60L 53/80 |
| 2019/0287330 A1 | 9/2019 | Geerlings et al. |
| 2020/0207208 A1* | 7/2020 | Lee ........................ B60K 37/02 |
| 2022/0169117 A1* | 6/2022 | Harris ..................... G06F 9/451 |
| 2022/0314794 A1* | 10/2022 | Eo ........................... G04F 8/003 |

* cited by examiner

PROGRAMMABLE INPUT DEVICE FOR A VEHICLE

FIELD OF THE DISCLOSURE

The present disclosure generally relates to an input device for a vehicle. More particularly, the present disclosure relates to a programmable auxiliary input device for a vehicle.

BACKGROUND OF THE DISCLOSURE

Vehicles often include an input device, such as a center stack touchscreen human-machine interface, that receives user inputs.

SUMMARY OF THE DISCLOSURE

According to a first aspect of the present disclosure, a system for a vehicle includes a first input device and a second input device that provides a plurality of selectable input options. The plurality of selectable input options comprises a plurality of control input options for controlling a plurality of vehicle functions and an association input option for associating the first input device with at least one vehicle function suggested from among the plurality of vehicle functions. The at least one vehicle function is suggested based on historical use of the control input option that controls the at least one vehicle function and an accessibility score of the control input option.

Embodiments of the first aspect of the present disclosure can include any one or a combination of the following features:
 the first input device is an auxiliary input device;
 the auxiliary input device includes at least one of a mechanical button, a rotary dial, and a mechanical slider;
 the auxiliary input device is mounted to a class A surface of the vehicle;
 the second input device is a touchscreen human-machine interface, wherein the selectable input options provided by the touchscreen human-machine interface are selectable by a user via a touch event on the touchscreen;
 the accessibility score is determined based on the number of touch events executed to select the control input option to control the at least one vehicle function; and
 the historical use of the control input option comprises the selection frequency of the control input option in a predetermined number of previous system-on cycles of the vehicle.

According to a second aspect of the present disclosure, a method of operating a system of a vehicle includes the steps of detecting a first input device, providing, on a second input device, a plurality of selectable control input options for controlling a plurality of vehicle functions, and providing at least one selectable association input option for associating the first input device with at least one vehicle function suggested from among the plurality of vehicle functions. The at least one vehicle function is suggested based on historical use of the control input option for controlling the at least one vehicle function, and an accessibility score of the control input option.

Embodiments of the second aspect of the present disclosure can include any one or a combination of the following features:
 the step of mounting the first input device to a class A surface of the vehicle;
 the at least one selectable association input option comprises a first selectable association input option for associating the first input device with a first vehicle function and a second selectable association input option for associating the first input device with a second vehicle function;
 the first input device includes at least one of a mechanical button, a rotary dial, and a mechanical slider;
 the at least one selectable association input option for associating the first input device with the at least one vehicle function is provided on the second input device;
 the second input device is a touchscreen human-machine interface of the vehicle, wherein the selectable control input options provided by the touchscreen human-machine interface are selectable by a user via a touch event on the touchscreen; and
 the step of determining the accessibility score based on the number of touch events executed to select the control input option to control the at least one vehicle function.

According to a third aspect of the present disclosure, a system for a vehicle includes an auxiliary input device and a touchscreen human-machine interface for the vehicle that provides a plurality of input options that may be selected by a user via a touch event on the touchscreen. The plurality of input options comprises a plurality of control input options for controlling a plurality of vehicle functions and an association input option for associating the auxiliary input device with at least one vehicle function suggested from among the plurality of vehicle functions. The at least one vehicle function is suggested based on historical use of the control input option that controls the at least one vehicle function and an accessibility score of the control input option.

Embodiments of a third aspect of the present disclosure can include any one or a combination of the following features:
 the auxiliary input device includes at least one of a mechanical button, a rotary dial, and a mechanical slider;
 the auxiliary input device is mounted to a class A surface of the vehicle;
 the auxiliary device is mounted to the class A surface of the vehicle via a magnet;
 the accessibility score is determined based on the number of touch events executed to select the control input option to control the at least one vehicle function; and
 the historical use of the control input option comprises the selection frequency of the control input option in a predetermined number of previous system-on cycles of the vehicle.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Additional features and advantages of the present disclosure will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as "first" and "second," "top" and "bottom," and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Class A surfaces include all visible exterior surfaces of a vehicle (e.g., body panels, bumper, grill, lights, etc.) and all visible surfaces of see-touch and feel parts in the interior of a vehicle (e.g., dashboard, seats, door pads, etc.).

Figure 1:
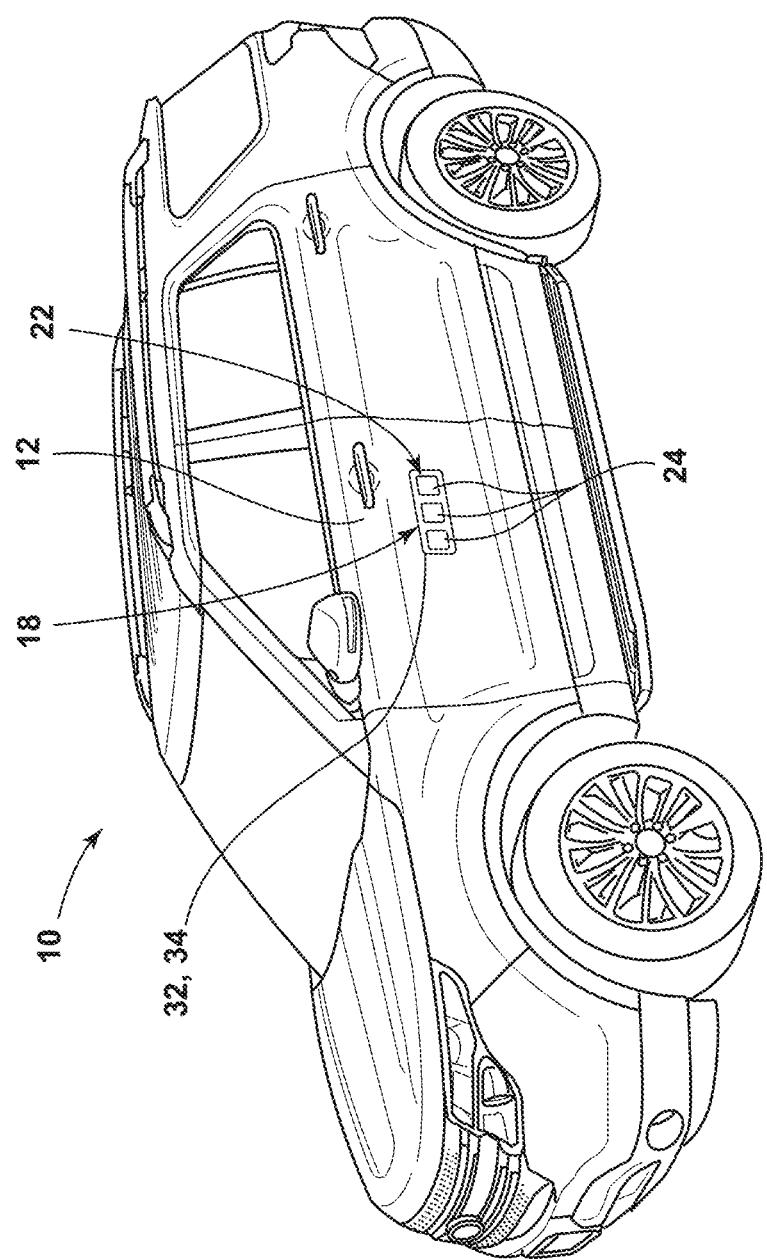
FIG. 1 is a perspective view of a vehicle, illustrating an auxiliary input device coupled to an exterior class A surface of the vehicle, according to one embodiment.
Figure 2:
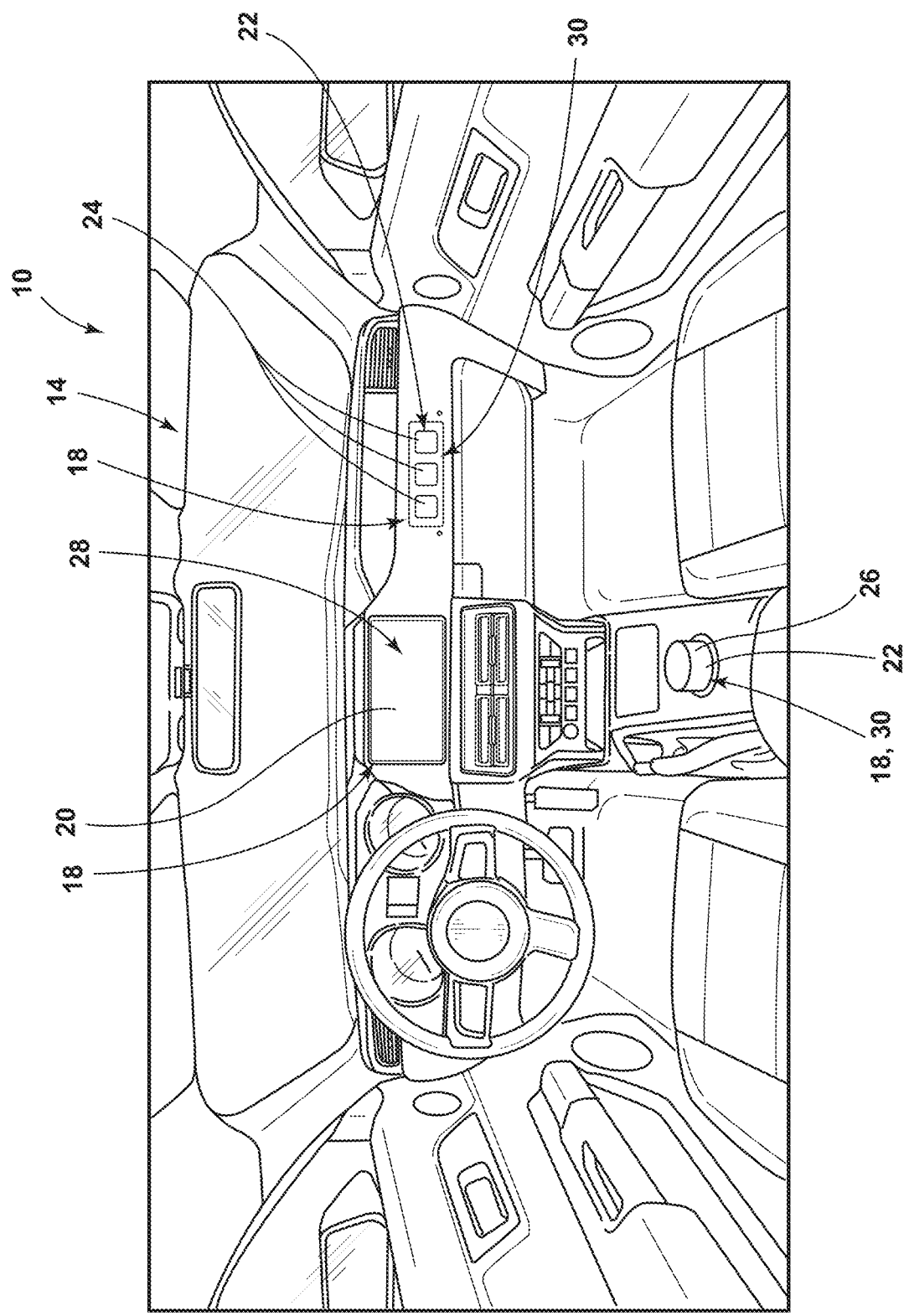
FIG. 2 is a perspective view of a vehicle interior of the vehicle, illustrating a touchscreen human-machine interface of the vehicle, and a plurality of auxiliary input devices coupled to class A surfaces of the vehicle interior, according to one embodiment.
Figure 9:
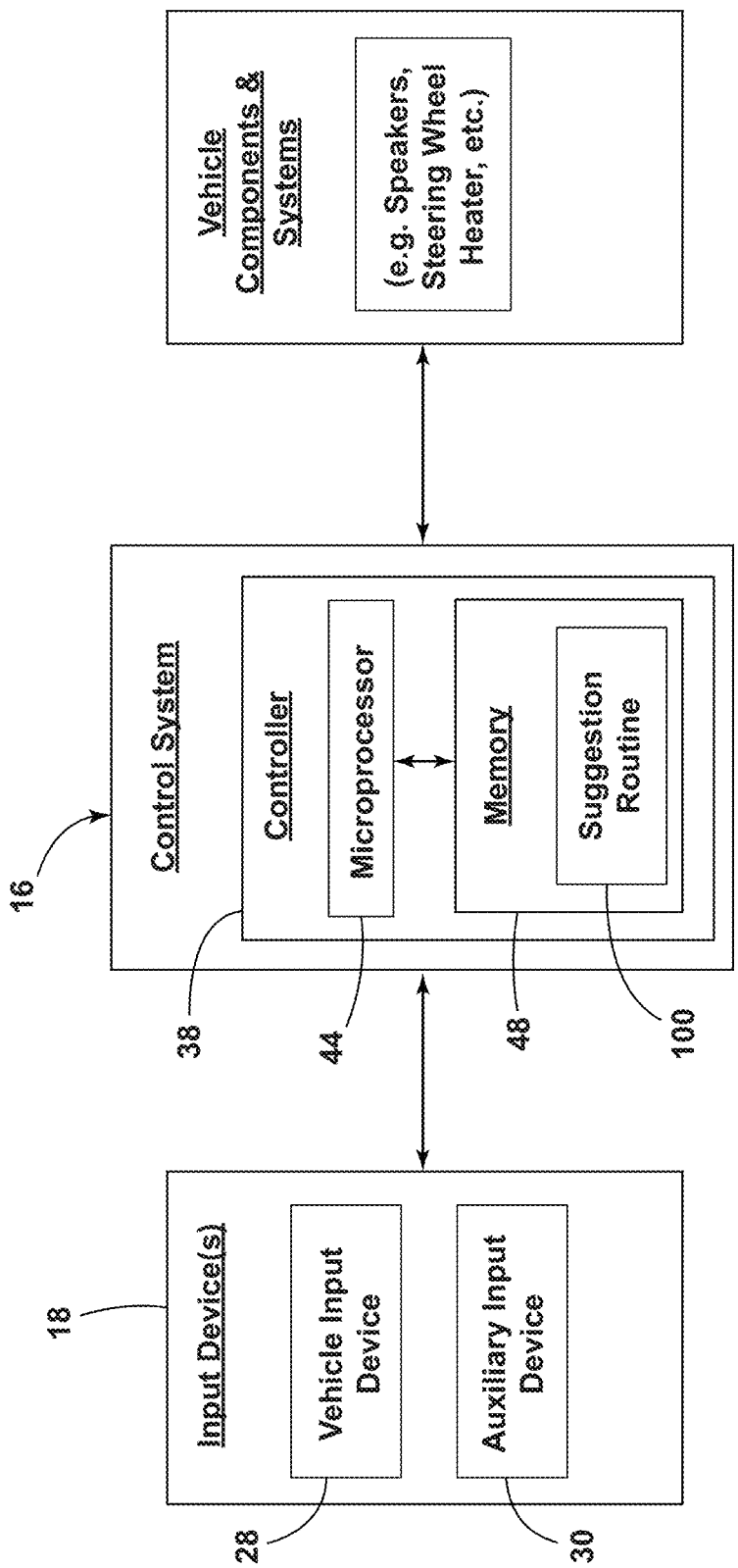
FIG. 9 is a block diagram of a system of the vehicle, according to one embodiment.

Referring now to FIGS. 1, 2, and 9, a vehicle 10 is illustrated. The vehicle 10 includes a vehicle exterior 12, as illustrated in FIG. 1, and a vehicle interior 14, as illustrated in FIG. 2. The vehicle 10 includes a control system 16. The control system 16 includes an input device 18. In various embodiments, the control system 16 includes a plurality of input devices 18. The input device 18 is configured to be actuated by a user of the vehicle 10 and transmit an input signal to one or more other components of the control system 16 of the vehicle 10 responsively. A variety of types of input devices 18 are contemplated. For example, the input device 18 may include a microphone that is configured to receive voice commands. The input device 18 may include an imager, such as a vehicle interior camera, for receiving gesture commands from a user. As illustrated in FIG. 2, the input device 18 may include a touchscreen human-machine interface (HMI) 20. As described further herein, the touchscreen HMI 20 may be configured to be actuated by a user via touch events on the touchscreen HMI 20. In various embodiments, the input device 18 may include one or more mechanical actuators 22, such as one or more buttons 24, sliders, rotary dials 26 (e.g., knob 26), joysticks, switches, toggle switches, rocker switches, and/or a combination thereof. In the embodiment illustrated in FIG. 2, the vehicle 10 includes the touchscreen HMI 20, a plurality of buttons 24, and a rotary dial 26.

The vehicle 10 may include at least one vehicle input device 28. The vehicle input device 28 is integrated with the vehicle 10. In various embodiments, the vehicle input device 28 is installed into the vehicle 10 during manufacturing of the vehicle 10 prior to a first commercial sale of the vehicle 10. A variety of such vehicle input devices 28 are contemplated, such as a center stack touchscreen HMI 20, a microphone for receiving voice commands, and/or various mechanical actuators 22 (e.g., buttons 24, etc.). In the embodiment illustrated in FIG. 2, the touchscreen HMI 20 is the vehicle input device 28.

Referring now to FIGS. 1 and 2, the vehicle 10 may include at least one auxiliary input device 30. The auxiliary input device 30 may be not installed during manufacturing of the vehicle 10 prior to the first commercial sale of the vehicle 10. In various embodiments, the auxiliary input device 30 is an aftermarket input device that is selectively coupled to the vehicle 10. In other words, the auxiliary input device 30 may be purchased for optional attachment to the vehicle 10. In the embodiment illustrated in FIG. 2, a plurality of auxiliary input devices 30 are coupled to class A surfaces of the vehicle interior 14. In particular, a first auxiliary input device 30 that includes a rotary knob 26 is coupled to a center console box lid, and a second auxiliary input device 30 that includes a plurality of buttons 24 is coupled to a portion of a dashboard that faces vehicle-rearward. In the embodiment illustrated in FIG. 1, the auxiliary input device 30 is coupled to the vehicle exterior 12 on a class A surface of the driver side door. The illustrated auxiliary input device 30 includes a plurality of buttons 24 that are configured to be mechanically actuated. It is contemplated that auxiliary input devices 30 may be coupled to various portions of the vehicle 10 by a variety of means. For example, in some embodiments, the auxiliary input device 30 may include a magnet 34 that is configured to be coupled to a corresponding magnetically compatible surface of the vehicle 10, as illustrated in FIG. 1, wherein the auxiliary input device 30 is magnetically coupled to the metal exterior of the driver side door of the vehicle 10.

Referring now to FIGS. 1-6, the input device 18 of the vehicle 10 may provide a plurality of selectable input options 36. The selectable input options 36 may be selected by the user via actuation of the input device 18. For example, the rotary knob 26 illustrated in FIG. 2 may provide a first selectable input option 36 and a second selectable input option 36, wherein turning the knob 26 clockwise selects the first input option 36 and turning the knob 26 counter-clockwise selects the second input option 36. In some implementations, wherein the input device 18 is the touchscreen HMI 20, as illustrated in FIGS. 3-6, the touchscreen HMI 20 may provide a plurality of selectable input options 36 that may be selected by a user via touch events (i.e., actuation of the HMI 20) on the touchscreen. Examples of touch events may include a swipe, press, pinch, and/or a variety of touch events. Selection of a selectable input option 36 provided by the input device 18 may prompt an input signal to be sent to a controller 38 of the control system 16, which may control outputs in response, as described further herein.

Referring still to FIGS. 1-6, in some embodiments, the plurality of selectable input options 36 provided by the input device 18 may include at least one control input option 40. In various embodiments, the plurality of selectable input options 36 may include a plurality of control input options 40. Selection of a control input option 40 may prompt controlling of one or more corresponding vehicle functions. For example, in an embodiment wherein the rotary knob 26 illustrated in FIG. 2 is associated with the volume of a speaker of the vehicle 10, selection of a first control input option 40 provided by the rotary knob 26, via clockwise rotation of the rotary knob 26, may increase the volume of the speaker, and selection of a second control input option 40, via counter-clockwise rotation the rotary knob 26, may decrease the volume of the speaker. In another exemplary embodiment, wherein the touchscreen HMI 20 includes a control input option 40 in the form of a displayed icon that may be selected via a touch event that is associated with a steering wheel heater, selection of the control input option 40 via the touch event may activate the steering wheel heater.

It is contemplated that the vehicle 10 may include various types of components and/or systems that may be controlled via selection of control input options 40 provided by input devices 18. For example, control input options 40 may be utilized to control at least one of the following vehicle functions: seating assembly adjustment, door adjustment (e.g., open, closed, etc.), window position adjustment, speaker volume adjustment, cabin heating and cooling adjustment, seating assembly heating and cooling adjustment, steering wheel heating and cooling adjustment, drive mode shifting (e.g., park, reverse, etc.), infotainment feature adjustment (e.g., radio, display, navigation, etc.), mirror position adjustment, and/or a combination thereof. The aforementioned list is not intended to be limiting with respect to controllable vehicle functions, as various other vehicle functions are contemplated.

In some embodiments, the plurality of input options 36 may include an association input option 42. Selection of the association input option 42 may prompt association of the input device 18 with a vehicle function, such that the vehicle function may be controlled via actuation of the input device 18. In an exemplary embodiment, the vehicle 10 includes first and second input devices 18. The first input device 18 provides a control input option 40 for controlling a given vehicle function. The given vehicle function may be associated with the second input device 18 in addition to the first input device 18 in response to selection of an association input option 42 for associating the second input device 18 with the given vehicle function. The association input option 42 may be provided for selection via the first input device 18, the second input device 18, and/or another input device 18. In various embodiments, the input device 18 that provides the control input option 40 originally may be the vehicle input device 28, such as the touchscreen HMI 20 illustrated in FIG. 2. In some embodiments, the input device 18 that is associated with the vehicle function controlled via selection of the control input option 40 may be the auxiliary input device 30, such as the rotary knob 26 and/or buttons 24 illustrated in FIG. 2.

Referring now to FIG. 9, the control system 16 may include and/or be in communication with the controller 38. The controller 38 may be configured with a microprocessor 44 to process logic and routines stored in memory 48 that receives information from a variety of vehicle systems, components, and/or devices, including one or more input devices 18. The controller 38 may receive input signals from the one or more input devices 18 and prompt execution of vehicle functions responsively. The controller 38 may include the microprocessor 44 and/or other analog and/or digital circuitry for processing one or more routines. Further, the controller 38 may include the memory 48 for storing one or more routines. It should be appreciated that the controller 38 may be a standalone dedicated controller or may be a shared controller integrated with other control functions. It should further be appreciated that certain functions may be carried out by a dedicated processor.

Figure 5:
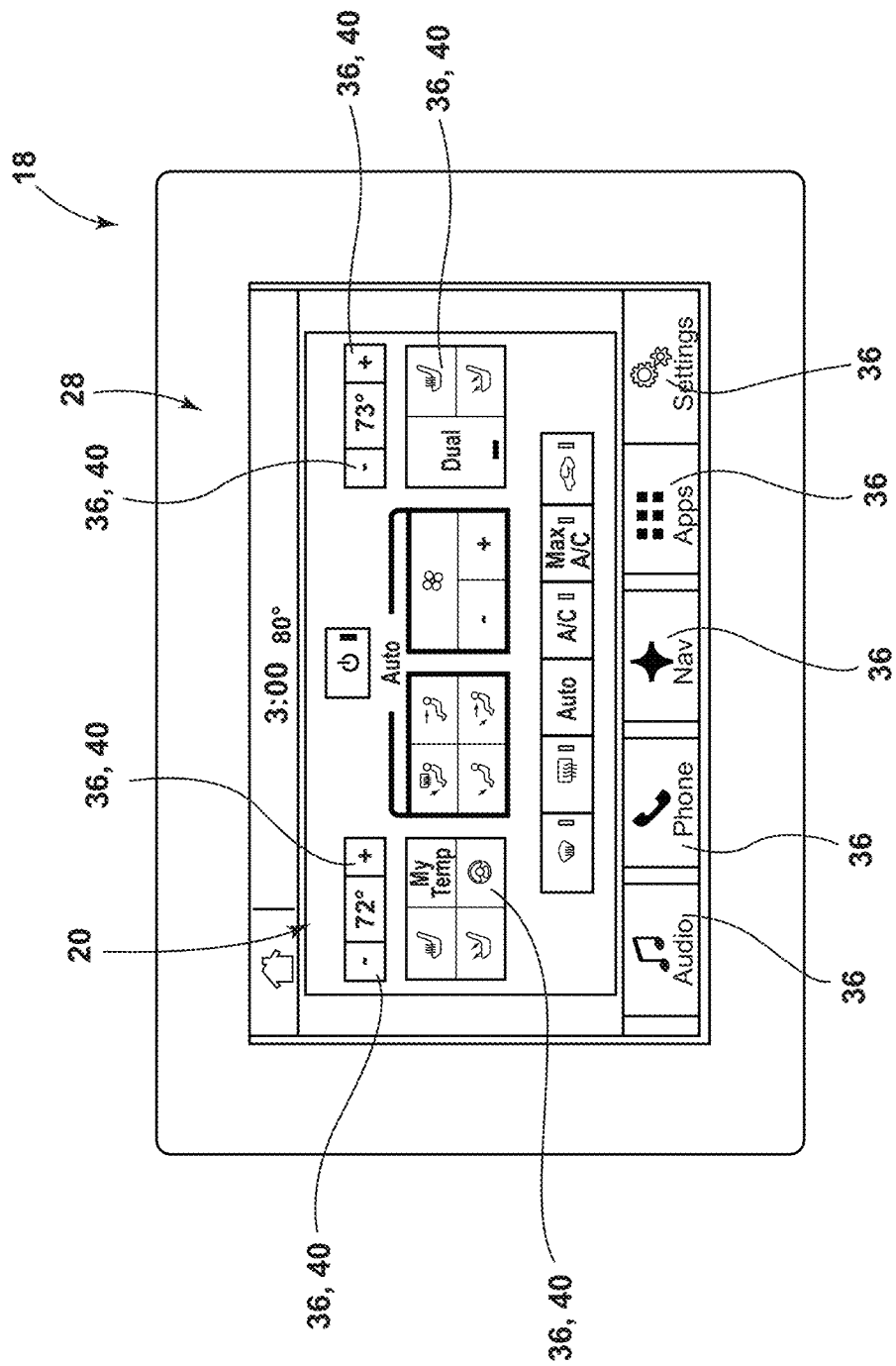
FIG. 5 is a front elevational view of the human-machine interface, illustrating a plurality of selectable input options, according to one embodiment.

In various embodiments, input device historical use data may be stored in the memory 48 of the controller 38. For example, the frequency with which a selectable input option 36 is selected by a user may be stored within the memory 48. In some implementations, the frequency with which the selectable input option 36 is selected by the user in a predetermined number of previous system-on cycles of the vehicle 10 may be stored in memory 48. For example, the number of times that the steering wheel heater ON icon illustrated on the touchscreen HMI 20 in FIG. 5 is selected by a user in the previous 10 times the vehicle 10 is turned on may be stored in memory 48. The system-on cycle may be the period between the vehicle 10 being turned on and off, in some embodiments. It is contemplated that system-on cycles may be synonymous with trips of the vehicle 10, in various embodiments.

Figure 3:
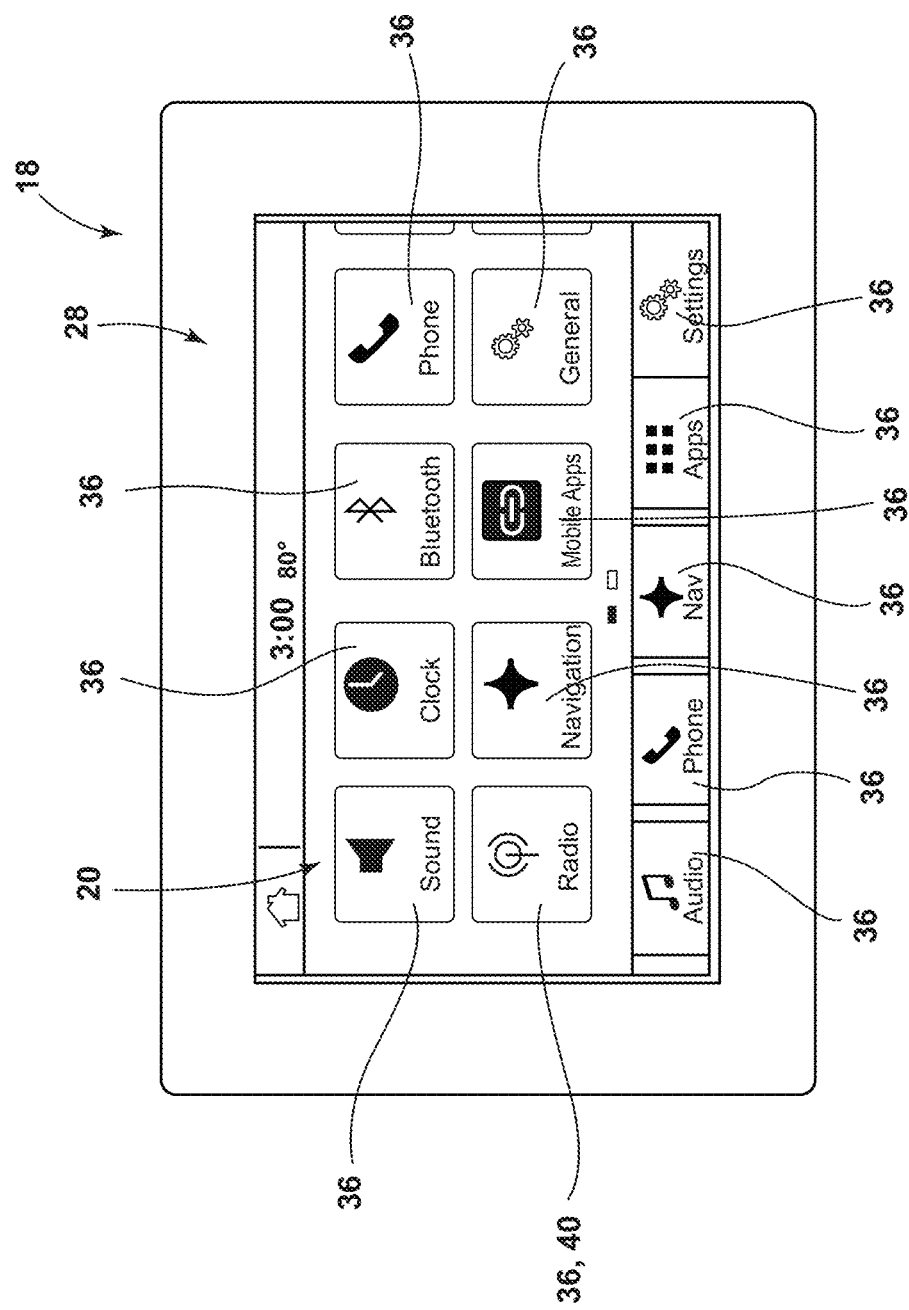
FIG. 3 is a front elevational view of the human-machine interface, illustrating a plurality of selectable input options, according to one embodiment.
Figure 4:
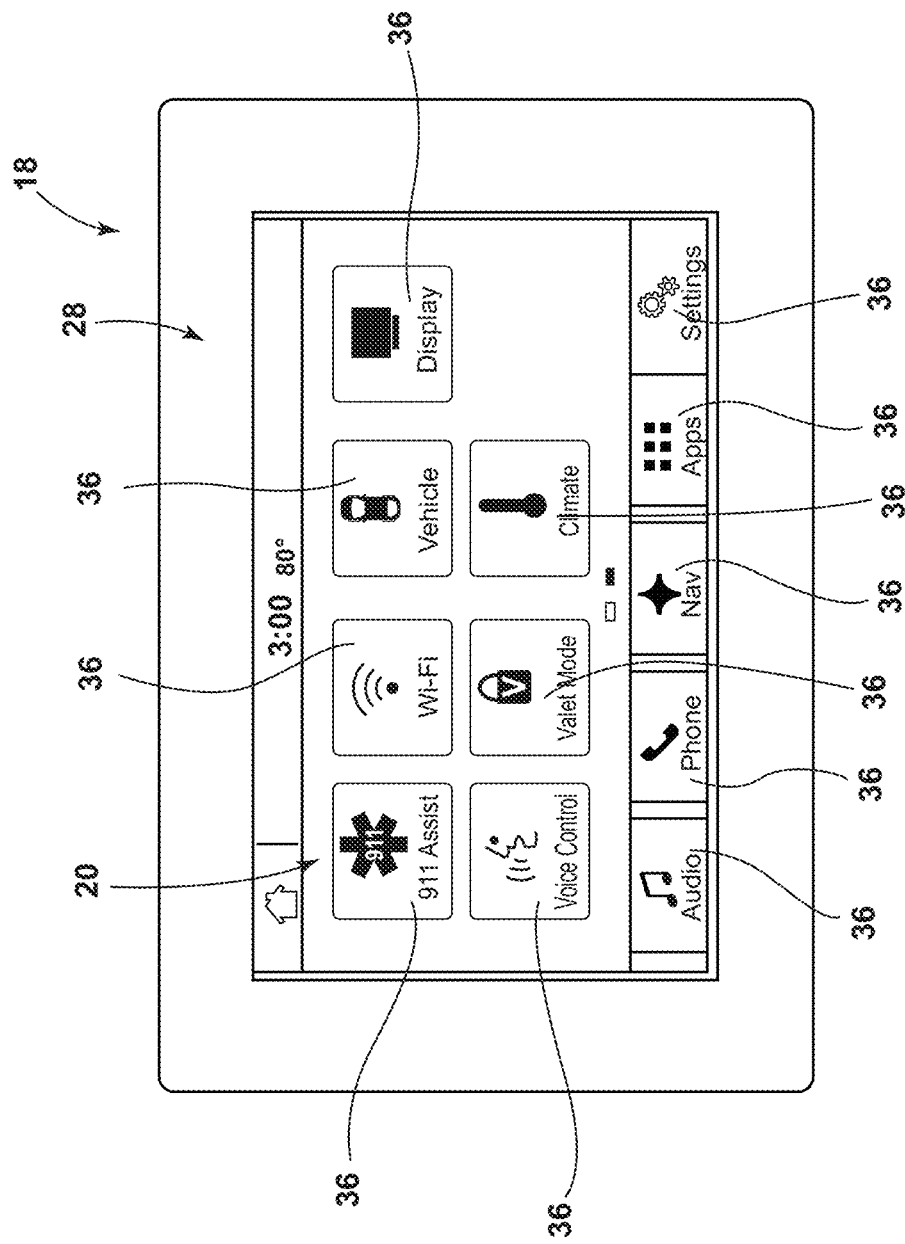
FIG. 4 is a front elevational view of the human-machine interface, illustrating a plurality of selectable input options, according to one embodiment.

The controller 38 may be operable to determine an accessibility score of a control input option 40 of an input device 18 of the vehicle 10. If a relatively large number of selectable input options 36 must be selected to provide access to the control input option 40 that controls a given vehicle function, the accessibility score of the control input option 40 may be relatively low. Conversely, if a relatively small number of selectable input options 36 must be selected to provide access to the control input option 40, then the accessibility score of the control input option 40 may be relatively high. For example, in the embodiment illustrated in FIGS. 3-6, the input device 18 is the touchscreen HMI 20 of the vehicle 10. As illustrated in FIG. 3, a home screen of the touchscreen HMI 20 is shown. The home screen includes a control input option 40 labeled RADIO that, upon selection, switches the infotainment mode of the vehicle 10 to FM radio, such that FM radio is played through the speakers of the vehicle 10. As such, a single touch event actuation of the touchscreen HMI 20 controls the corresponding vehicle function, which results in a relatively high accessibility score for the radio control input option 40.

As illustrated in FIG. 5, the touchscreen HMI 20 provides a selectable control input option 40 that is associated with the steering wheel heater of the vehicle 10. In order to access the steering wheel heater control input option 40, three touch event actuations of the touchscreen HMI 20 are necessary—a swipe touch event to move from the home screen illustrated in FIG. 3 to the screen illustrated in FIG. 4, a press touch event on the climate input option illustrated in FIG. 4, and an additional press touch event on the steering wheel heater control input option 40, illustrated in FIG. 5. As such, the steering wheel heater input option has a relatively lower accessibility score. It is contemplated that various control input options 40 of a variety of different types of input devices 18 may have various accessibility scores. For example, if a first control input option 40 is selected via a single actuation of a mechanical button 24, the first control input option 40 may include a first accessibility score, while if a second control input option 40 is selectable via three actuations of a mechanical button 24, the second control input option 40 may have a second accessibility score that is lower than the first accessibility score.

Figure 6:
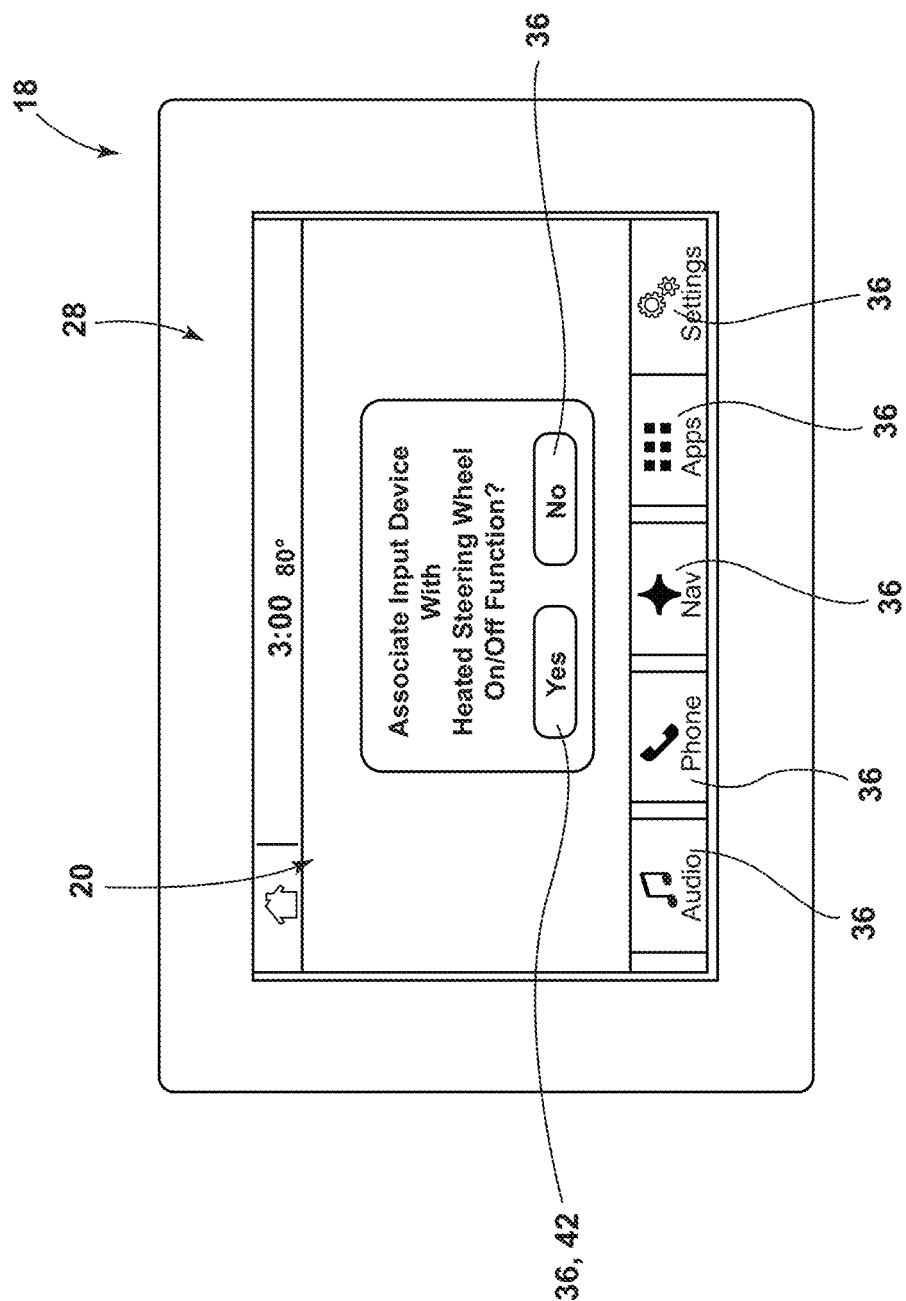
FIG. 6 is a front elevational view of the human-machine interface, illustrating a selectable association input option, according to one embodiment.

Referring now to FIG. 6, in some embodiments, the control system 16 may be configured to suggest that a first input device 18 be associated with a vehicle function that is controlled by a control input option 40 of a second input device 18. The control system 16 may suggest association of the first input device 18 and the vehicle function based on historical use of the control input option 40, such as the frequency that the control input option 40 is selected, and the accessibility score of the control input option 40. In the embodiment illustrated in FIG. 6, the touchscreen HMI 20 provides an association input option 42 for associating another input device 18 with the vehicle function of turning the steering wheel heater on and off. It is contemplated that various vehicle functions may be suggested for association with an input device 18 based on historical use data and the accessibility score of the control input option 40. As described further herein, in some embodiments, the control input option 40 that controls the vehicle function, and for which the accessibility score and historical use data is recorded, may be provided for selection by the vehicle input device 28, and the input device 18 that is to be associated with the vehicle function may be the auxiliary input device 30.

Figure 7:
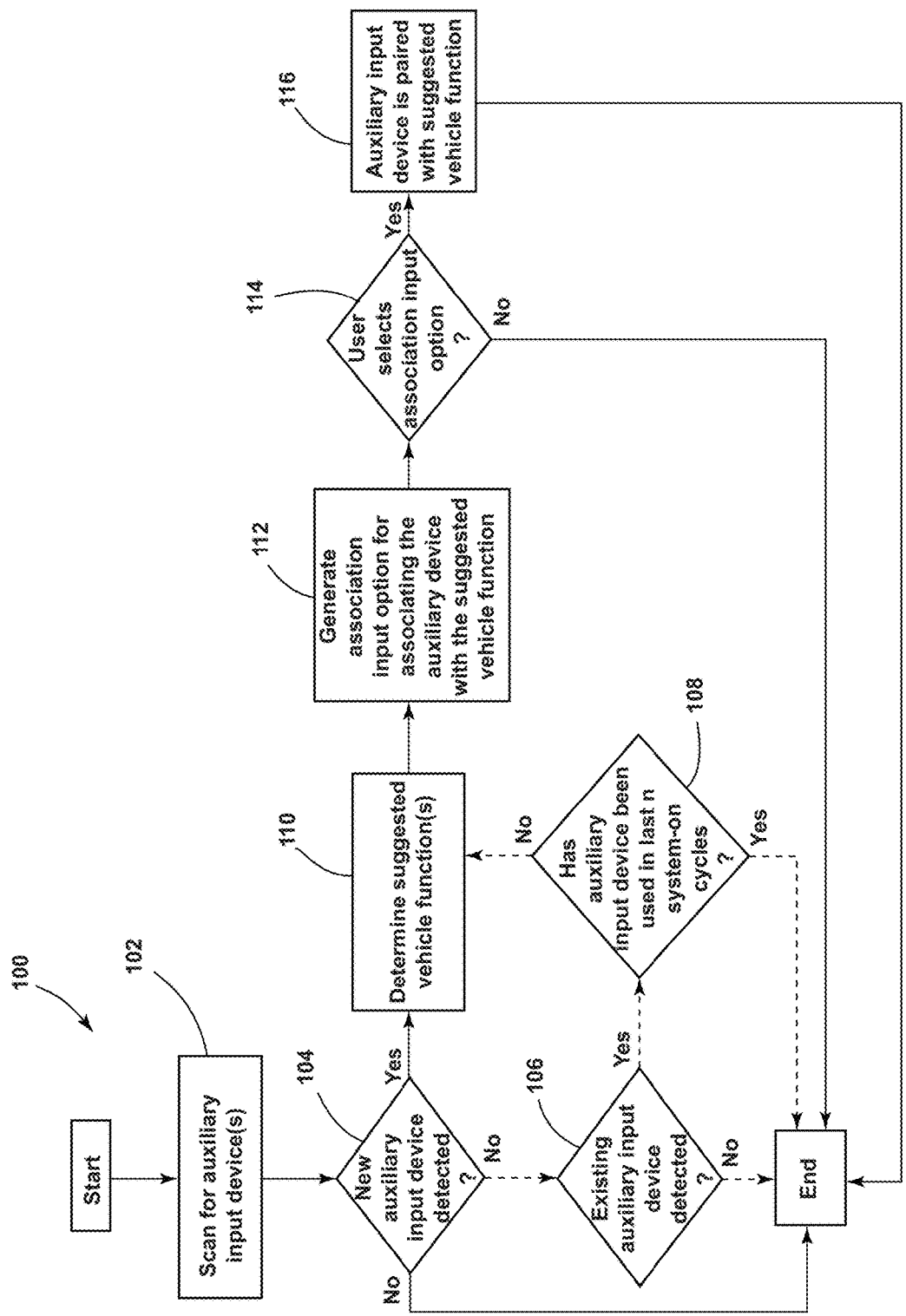
FIG. 7 is a flow chart diagram of an operating routine of a system of the vehicle, according to one embodiment.

Referring now to FIG. 7, the control system 16 is operable to execute a suggestion routine 100. The suggestion routine 100 initiates with step 102 of scanning for auxiliary input devices 30. In various embodiments, a wireless auxiliary input device 30 may be scanned for. It is contemplated that the control system 16 may scan for the auxiliary input devices 30 via a variety of types of communication protocols, such as wireless communication protocols (e.g., Bluetooth®, Wi-Fi, etc.) and wired communication.

If a new or unrecognized auxiliary input device 30 is not detected by the control system 16 at step 104, the routine 100 ends. In an alternative embodiment, the routine 100 may instead proceed to step 106, as illustrated in phantom in FIG. 7. If no known auxiliary input devices 30 (e.g., previously detected by the control system 16) are detected at step 106, the routine 100 ends. If a known auxiliary input device 30 is detected at step 106, the routine 100 proceeds to step 108. If it is determined at step 108 that the known auxiliary input device 30 has been actuated in a predetermined number of preceding system-on cycles of the vehicle 10, the routine 100 ends. If the input device 18, instead, has not been actuated in the predetermined number of preceding system-on cycles of the vehicle 10, then the routine 100 proceeds to step 110 of determining suggested vehicle functions. As illustrated in FIG. 7, if a new input device 18 is detected at step 104, the routine 100 proceeds to step 110 of determining the suggested vehicle function.

At step 110, the control system 16 determines which of the vehicle functions controlled by control input options 40 of vehicle input devices 28 are to be suggested for association with the detected auxiliary input device 30. In various embodiments, the control system 16 may suggest the vehicle function for association with the auxiliary input device 30 based on the historical use data (e.g., frequency) of the corresponding control input option 40 and the accessibility score of the corresponding control input option 40. In various implementations, the control system 16 may suggest a first vehicle function for association with the auxiliary input device 30 over a second vehicle function based on historical usage data indicating more frequent use of the first control input option 40 relative to the second control input option 40 and/or a lower accessibility score of the first control input option 40 relative to the second control input option 40. In some embodiments, the control system 16 may filter out one or more vehicle functions from the plurality of vehicle functions for potential association with the auxiliary input device 30 based on incompatibility of the vehicle function with the auxiliary input device 30. For example, if the auxiliary input device 30 comprises a single mechanical button 24, the control system 16 may preliminarily filter out speaker volume adjustment from among the plurality of vehicle functions that may potentially be associated with the auxiliary input device 30, as a single mechanical button 24 does not afford an opportunity to adjust speaker volume both up and down.

In some embodiments, the control system 16 may determine the suggested vehicle function based on other factors in addition to the historical usage data of the control input option 40 and the accessibility score of the control input option 40. For example, the control system 16 may apply a predicted future usage multiplier. The predicted future usage multiplier may take into account a variety of external factors, such as seasonal factors, weather, GPS location, and/or a combination thereof. For example, the control system 16 may receive an input from a temperature sensor indicating that the average ambient exterior temperature over the past month has been below 32° F. In response, the control system 16 may more heavily weigh control input options 40 that control heating functions of the vehicle (e.g., steering wheel heater, seat warmers, etc.).

Next, the routine 100 proceeds to step 112, wherein an association input option 42 for associating the auxiliary input device 30 with the suggested vehicle function determined in step 110 is provided. The association input option 42 may be provided for selection on the vehicle input device 28 that provides the control input option 40 that controls the suggested vehicle function. In some embodiments, the association input option 42 may be provided on the auxiliary input device 30. In some embodiments, the association input option 42 may be provided on an input device 18 other than the auxiliary input device 30 and the vehicle input device 28 that provides the control input option 40.

If the association input option 42 is not selected by the user at step 114, the routine 100 ends. If, at step 114, the association input option 42 is selected by the user, the routine 100 proceeds to step 116, wherein the auxiliary input device 30 is associated with the suggested vehicle function, such that the actuation of the auxiliary input device 30 is operable to control the suggested vehicle function.

Figure 8:
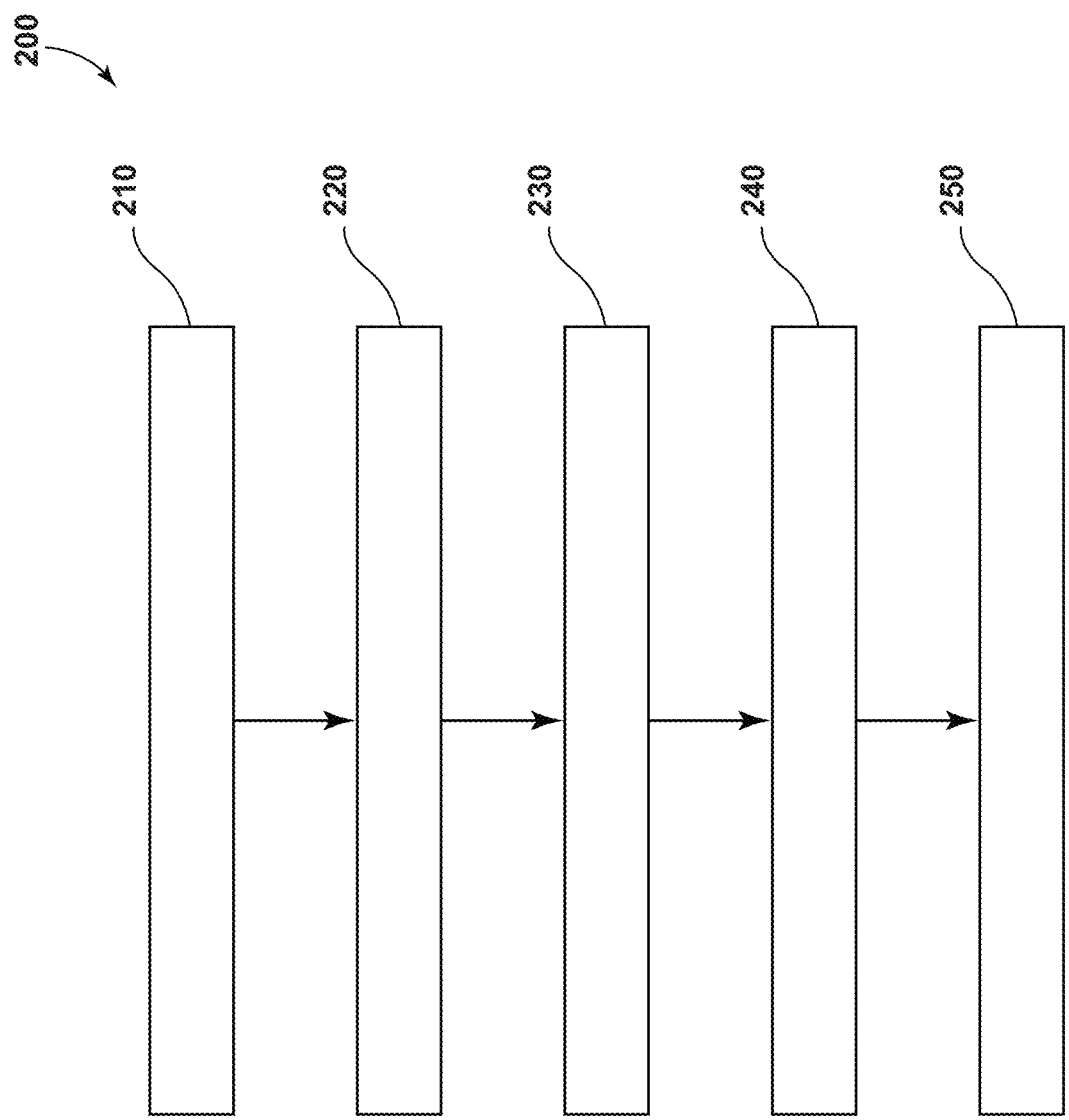
FIG. 8 is a flow schematic, illustrating the steps of a method of operating a system of the vehicle, according to one embodiment.

Referring now to FIG. 8, method 200 of operating the control system 16 of the vehicle 10 includes the step 210 of detecting a first input device 18. In various embodiments, the first input device 18 may be the auxiliary input device 30. It is contemplated that the first input device 18 may be the vehicle input device 28, in some embodiments. In various embodiments, the first input device 18 may include a mechanical actuator 22, such as a mechanical button 24, a rotary dial 26, and/or a mechanical slider. A plurality of mechanical actuators 22 are contemplated. The first input device 18 may be detected by the control system 16 via a variety of features and/or communication protocols (e.g., Bluetooth®, Wi-Fi, etc.).

The method 200 may include the step 220 of providing, on a second input device 18, a plurality of selectable control input options 40 for controlling a plurality of vehicle functions. In various embodiments, the second input device 18 may be the vehicle input device 28. For example, the second input device 18 may be the touchscreen HMI 20, as illustrated in FIGS. 2-6. The selectable control input options 40 provided on the touchscreen HMI 20 may be selectable by a user via a touch event on the touchscreen (e.g., swipe, press, etc.).

The method 200 of operating the control system 16 of the vehicle 10 may include the step 230 of determining an accessibility score of a control input option 40 provided by the second input device 18. In some embodiments, wherein the second input device 18 is the touchscreen HMI 20, the accessibility score may be determined based on the number of touch events executed to select the control input option 40 to control the at least one vehicle function.

The method 200 may include the step 240 of providing at least one selectable association input option 42 for associating the first input device 18 with at least one vehicle function suggested from among the plurality of vehicle functions. In various embodiments, the at least one association input option 42 may be provided in response to execution of the step 210 of detecting the first input device 18. In various embodiments, the at least one vehicle function may be suggested based on historical use of the control input option 40 for controlling the at least one vehicle function, and an accessibility score of the control input option 40. In some embodiments, the at least one selectable association input option 42 for associating the first input device 18 with the at least one vehicle function may be provided on the second input device 18. It is contemplated that, in some embodiments, the at least one selectable association input option 42 for associating the first input device 18 with the at least one vehicle function may be generated on the first input device 18 and/or on an input device 18 other than the first and second input devices 18. In some embodiments, the at least one selectable association input option 42 comprises a first selectable association input option 42 for associating the first input device 18 with a first vehicle function and a second selectable association input option 42 for associating the first input device 18 with a second vehicle function. For example, in an exemplary embodiment, wherein the second input device 18 is the touchscreen HMI 20, the touchscreen HMI 20 may provide a plurality of selectable association input options 42 that, if selected, would associate the first input device 18 with respective vehicle functions.

The method 200 of operating a control system 16 of the vehicle 10 may include the step 250 of mounting the first input device 18 to a class A surface of the vehicle 10. In the exemplary embodiment, the first input device 18 is an auxiliary input device 30, that includes an attachment feature 32 configured to attach the auxiliary input device 30 to a class A surface of the vehicle 10. In some embodiments, the attachment feature 32 may be a magnet 34 that magnetically couples the auxiliary input device 30 to a compatible surface of the vehicle 10, as illustrated in FIG. 1. A variety of types of attachment features 32 are contemplated (e.g., adhesives, hook and loop fasteners, immediately engaging fasteners, etc.).

The control system 16 of the present disclosure may provide a variety of advantages. For example, the control system 16 suggesting a vehicle function for association with an auxiliary input device 30 that has been newly detected by the control system 16 based on historical usage data and an accessibility score of a plurality of control input options 40 that control the corresponding plurality of vehicle functions may provide a user with a suggested vehicle function for association with the first input option 36 that is often used by the user and is difficult to use by the user via the existing control input option 40.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A system for a vehicle, comprising:
a first input device;
a second input device that provides a plurality of selectable input options, the plurality of selectable input options comprising a plurality of control input options for controlling a plurality of vehicle functions and an association input option for associating the first input device with at least one vehicle function suggested from among the plurality of vehicle functions, wherein the at least one vehicle function is suggested based on historical use of the control input option that controls the at least one vehicle function and an accessibility score of the control input option.

2. The system of claim 1, wherein the first input device is an auxiliary input device.

3. The system of claim 2, wherein the auxiliary input device includes at least one of a mechanical button, a rotary dial, and a mechanical slider.

4. The system of claim 2, wherein the auxiliary input device is mounted to a class A surface of the vehicle.

5. The system of claim 1, wherein the second input device is a touchscreen human-machine interface, wherein the selectable input options provided by the touchscreen human-machine interface are selectable by a user via a touch event on the touchscreen.

6. The system of claim 5, wherein the accessibility score is determined based on the number of touch events executed to select the control input option to control the at least one vehicle function.

7. The system of claim 1, wherein the historical use of the control input option comprises the selection frequency of the control input option in a predetermined number of previous system-on cycles of the vehicle.

8. A method of operating a system of a vehicle, comprising the steps of:
detecting a first input device;

providing, on a second input device, a plurality of selectable control input options for controlling a plurality of vehicle functions; and providing at least one selectable association input option for associating the first input device with at least one vehicle function suggested from among the plurality of vehicle functions, wherein the at least one vehicle function is suggested based on historical use of the control input option for controlling the at least one vehicle function, and an accessibility score of the control input option.

9. The method of claim 8, further comprising the step of:

mounting the first input device to a class A surface of the vehicle.

10. The method of claim 8, wherein the at least one selectable association input option comprises a first selectable association input option for associating the first input device with a first vehicle function and a second selectable association input option for associating the first input device with a second vehicle function.

11. The method of claim 8, wherein the first input device includes at least one of a mechanical button, a rotary dial, and a mechanical slider.

12. The method of claim 8, wherein the at least one selectable association input option for associating the first input device with the at least one vehicle function is provided on the second input device.

13. The method of claim 8, wherein the second input device is a touchscreen human-machine interface of the vehicle, wherein the selectable control input options provided by the touchscreen human-machine interface are selectable by a user via a touch event on the touchscreen.

14. The method of claim 13, further comprising the step of:

determining the accessibility score based on the number of touch events executed to select the control input option to control the at least one vehicle function.

15. A system for a vehicle, comprising:

an auxiliary input device;

a touchscreen human-machine interface for the vehicle that provides a plurality of input options that may be selected by a user via a touch event on the touchscreen, the plurality of input options comprising a plurality of control input options for controlling a plurality of vehicle functions and an association input option for associating the auxiliary input device with at least one vehicle function suggested from among the plurality of vehicle functions, wherein the at least one vehicle function is suggested based on historical use of the control input option that controls the at least one vehicle function and an accessibility score of the control input option.

16. The system of claim 15, wherein the auxiliary input device includes at least one of a mechanical button, a rotary dial, and a mechanical slider.

17. The system of claim 15, wherein the auxiliary input device is mounted to a class A surface of the vehicle.

18. The system of claim 17, wherein the auxiliary device is mounted to the class A surface of the vehicle via a magnet.

19. The system of claim 15, wherein the accessibility score is determined based on the number of touch events executed to select the control input option to control the at least one vehicle function.

20. The system of claim 15, wherein the historical use of the control input option comprises the selection frequency of the control input option in a predetermined number of previous system-on cycles of the vehicle.

* * * * *